United States Patent
Zeng et al.

(10) Patent No.: US 12,438,857 B2
(45) Date of Patent: Oct. 7, 2025

(54) METHOD AND APPARATUS FOR IMPLEMENTING SECURE MULTICAST IN BLOCKCHAIN NETWORK

(71) Applicants: Alipay (Hangzhou) Information Technology Co., Ltd., Hangzhou (CN); Ant Blockchain Technology (Shanghai) Co., Ltd., Shanghai (CN)

(72) Inventors: Ke Zeng, Hangzhou (CN); Chao Zeng, Hangzhou (CN); Lingtao Kong, Hangzhou (CN)

(73) Assignees: Alipay (Hangzhou) Information Technology Co., Ltd., Hangzhou (CN); Ant Blockchain Technology (Shanghai) Co., Ltd., Shanghai (CN)

( * ) Notice: Subject to any disclaimer, the term of this patent is extended or adjusted under 35 U.S.C. 154(b) by 242 days.

(21) Appl. No.: 18/275,665

(22) PCT Filed: Jan. 13, 2022

(86) PCT No.: PCT/CN2022/071800
§ 371 (c)(1),
(2) Date: Aug. 3, 2023

(87) PCT Pub. No.: WO2022/166556
PCT Pub. Date: Aug. 11, 2022

(65) Prior Publication Data
US 2024/0129281 A1  Apr. 18, 2024

(30) Foreign Application Priority Data
Feb. 3, 2021 (CN) .......... 202110152304.X (51) Int. Cl.
*H04L 29/06* (2006.01)
*H04L 9/06* (2006.01)
(Continued)

(52) U.S. Cl.
CPC ........ *H04L 63/0442* (2013.01); *H04L 9/0618* (2013.01); *H04L 9/0833* (2013.01); *H04L 9/14* (2013.01); *H04L 9/40* (2022.05)

(58) Field of Classification Search
CPC ..... H04L 63/0442; H04L 9/40; H04L 9/0618; H04L 9/0833; H04L 9/14
See application file for complete search history.

(56) References Cited

U.S. PATENT DOCUMENTS

| 2005/0044356 A1 | 2/2005 | Srivastava et al. |
| 2019/0251199 A1* | 8/2019 | Klianev ................. G06Q 40/04 |

(Continued)

FOREIGN PATENT DOCUMENTS

| CN | 1668000 A | 9/2005 |
| CN | 102684875 A | 1/2021 |
| CN | 112217645 A | 1/2021 |

OTHER PUBLICATIONS

The International Search Report and Written Opinion of the International Searching Authority for Intl. Application No. PCT/CN2022/071800 mailed on Nov. 8, 2022.
(Continued)

*Primary Examiner* — Evans Desrosiers
(74) *Attorney, Agent, or Firm* — Womble Bond Dickinson (US) LLP (57) ABSTRACT

A method and an apparatus for implementing secure multicast in a blockchain network. The method includes: a first blockchain node generates and sends a security group creation message including a security group information structure corresponding to each target blockchain node to be added to a multicast security group, each security group information structure including a public key of a corresponding target blockchain node and ciphertext security group information obtained by encrypting plaintext security group information by using the public key, the plaintext security group information including a security group session key; and a second blockchain node searches, after receiving the security group creation message, the security group creation message for a security group information structure that includes a public key of the second blockchain node, and decrypts ciphertext security group information in the identified security group information structure to obtain the security group session key.

16 Claims, 3 Drawing Sheets

(51) Int. Cl.
  *H04L 9/08*   (2006.01)
  *H04L 9/14*   (2006.01)
  *H04L 9/40*   (2022.01)

(56) References Cited

U.S. PATENT DOCUMENTS

2020/0084194 A1* 3/2020 Mcmurdie ............ H04L 9/0833
2021/0234668 A1* 7/2021 Manamohan ......... H04L 9/0825

OTHER PUBLICATIONS

Palak Bagga et al., "Blockchain-based batch authentication protocol for Internet of Vehicles," https://doi.org/10.1016/j.sysarc.2020.101877, Journal of Systems Architecture, vol. 113, 2021, 101877, ISSN 1383-7621. (https://www.sciencedirect.com/science/article/pii/S1383762120301569). pp. 1-16.
"Extended European Search Report" for the application No. 22748835.0, mailed on Nov. 25, 2024. pp. 1-10.
Olivier Alphand, et al., "IoTChain: A Blockchain Security Architecture for the Internet of Things", 2018 IEEE Wireless Communications and Networking Conference (WCNC), IEEE, Apr. 15, 2018 (Apr. 15, 2018), Barcelona, Spain. hal-01705455, XP033355380, DOI: 10.1109/WCNC.2018.8377385. pp. 1-7.

* cited by examiner

METHOD AND APPARATUS FOR IMPLEMENTING SECURE MULTICAST IN BLOCKCHAIN NETWORK

TECHNICAL FIELD

One or more embodiments of this specification relate to the field of terminal technologies, and in particular, to a method and an apparatus for implementing secure multicast in a blockchain network.

BACKGROUND

In conventional IP multicast, if a central station wants to transmit a same data packet to two branch stations (for example, a branch station A and a branch station B), the central station needs to establish a security association (SA) with each of the branch station A and the branch station B. In such case, traffic that the central station sends data to the branch station A cannot be decrypted by the branch station B, and vice versa. It can be learned that, if a conventional IP multicast scenario includes one-to-many transmission or many-to-many transmission, many security associations usually need to be established, greatly increasing network complexity and maintenance difficulty.

To resolve the above-mentioned problem, some solutions are provided in related technologies. In these solutions, a key server can distribute keys to members that need to implement multicast, so that these members can encrypt multicast messages by using the distributed keys for transmission, so as to implement secure multicast. However, introduction of the key server increases architecture complexity and management difficulty. In addition, the key server plays a role of centralized management, which conflicts with decentralization of a blockchain technology. Consequently, the key server cannot be applied to secure multicast in a blockchain scenario.

SUMMARY

In view of this, one or more embodiments of this specification provide a method and an apparatus for implementing secure multicast in a blockchain network.

To achieve the above-mentioned objective, one or more embodiments of this specification provide the following technical solutions:

According to a first aspect of one or more embodiments of this specification, a method for implementing secure multicast in a blockchain network is provided, including: A first blockchain node generates and sends a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and a second blockchain node searches, after receiving the security group creation message, the security group creation message for a security group information structure that includes a public key of the second blockchain node, and decrypts, by using a private key of the second blockchain node, ciphertext security group information in the identified security group information structure to obtain the security group session key.

According to a second aspect of one or more embodiments of this specification, a method for implementing secure multicast in a blockchain network is provided, including: A first blockchain node generates a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and the first blockchain node sends the security group creation message, so that each target blockchain node searches the security group creation message for a security group information structure that includes a public key of the target blockchain node, and decrypts, by using a private key of the target blockchain node, ciphertext security group information in the identified security group information structure to obtain the security group session key.

According to a third aspect of one or more embodiments of this specification, a method for implementing secure multicast in a blockchain network is provided, including: A second blockchain node receives a security group creation message sent by a first blockchain node, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and the second blockchain node searches the security group creation message for a security group information structure that includes a public key of the second blockchain node, and decrypts, by using a private key of the second blockchain node, ciphertext security group information in the identified security group information structure to obtain the security group session key.

According to a fourth aspect of one or more embodiments of this specification, an apparatus for implementing secure multicast in a blockchain network is provided, including: a message creation unit, configured to enable a first blockchain node to generate a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and a message sending unit, configured to enable the first blockchain node to send the security group creation message, so that each target blockchain node searches the security group creation message for a security group information structure that includes a public key of the target blockchain node, and decrypts, by using a private key of the target blockchain node, ciphertext security group information in the identified security group information structure to obtain the security group session key.

According to a fifth aspect of one or more embodiments of this specification, an apparatus for implementing secure multicast in a blockchain network is provided, including: a message receiving unit, configured to enable a second blockchain node to receive a security group creation message sent by a first blockchain node, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and a message processing unit, configured to enable the second blockchain node to search the security group creation message for a security group information structure that includes a public key of the second blockchain node, and decrypt, by using a private key of the second blockchain node, ciphertext security group information in the identified security group information structure to obtain the security group session key.

According to a sixth aspect of one or more embodiments of this specification, an electronic device is provided, including: a processor; and a memory configured to store a processor-executable instruction, where the processor runs the executable instruction to implement the method according to the second aspect or the third aspect.

According to a seventh aspect of one or more embodiments of this specification, a computer-readable storage medium is provided, where the computer-readable storage medium stores a computer instruction, and the instruction is executed by a processor to implement the method according to the second aspect or the third aspect.

It can be learned from the above-mentioned technical solutions that, in this specification, each blockchain node in the blockchain network can obtain a public key of another blockchain node. With such a characteristic, the security group creation message generated by the first blockchain node may include the security group information structure corresponding to each target blockchain node. In addition, each security group information structure includes only a public key of a corresponding target blockchain node and ciphertext security group information encrypted based on the public key, so that the target blockchain node can identify a security group information structure corresponding to the target blockchain node by matching a public key. In addition, it can be ensured that the ciphertext security group information can only be decrypted by the target blockchain node by using a private key of the target blockchain node, and cannot be decrypted by another blockchain node. As such, a secure and accurate key sharing operation can be implemented to create a multicast security group without requiring an additional centralized key server, so that blockchain nodes in the multicast security group can implement secure multicast by using the above-mentioned security group session key.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of this specification. On the contrary, the implementations are merely examples of apparatuses and methods that are described in the appended claims in detail and consistent with some aspects of one or more embodiments of this specification.

It should be noted that the steps of the corresponding method are not necessarily performed in the order shown and described in this specification in other embodiments. In some other embodiments, the method can include more or less steps than those described in this specification. In addition, a single step described in this specification may be decomposed into a plurality of steps in other embodiments for description; and a plurality of steps described in this specification may be combined into a single step for description in other embodiments.

Based on different degrees of openness, blockchain networks can be classified into a public blockchain, a private blockchain, a consortium blockchain, etc. The public blockchain has a highest degree of openness, the private blockchain has a lowest degree of openness, and the consortium blockchain has a degree of openness that is between degrees of openness of the public blockchain and the private blockchain. A blockchain network includes some blockchain nodes that need to implement communication operations such as consensus, transaction transmission, and block synchronization. Blockchain nodes can communicate with each other by using a peer to peer (P2P) technology. Alternatively, each blockchain node can use a relay node in a blockchain relay communication network, for example, blockchain nodes that need to communicate separately access the relay node so that the blockchain nodes can implement communication by using the blockchain relay communication network. Compared with communication by using a P2P technology, a blockchain relay communication network is a backbone relay communication network for real-time transmission of a blockchain, and relay nodes can communicate and interact with each other by using optimal bandwidth with high QoS assurance. Therefore, the blockchain relay communication network takes over intermediate links for communication between blockchain nodes, thereby reducing a communication delay, improving stability, and significantly improving communication quality between blockchain nodes. For example, blockchain relay communication networks in related technologies may include: blockchain relay communication networks applied to the public blockchain, mainly including Falcon, Fast Bitcoin Relay Network (FBRN), Fast Internet Bitcoin Relay Engine (FIBRE), and the like; and blockchain relay communication networks applied to the consortium blockchain, mainly including BloXRoute, Blockchain Transmission Network (BTN), and the like.

Regardless of whether the P2P technology or the blockchain relay communication network is used, blockchain nodes may have multicast demands. For example, some blockchain nodes in the blockchain network may need to implement secure communication based on service demands or other demands, and do not want other blockchain nodes in the blockchain network to learn communication content. To this end, a multicast security group can be established between these blockchain nodes according to a technical solution of this specification, so that communication efficiency can be improved through multicast instead of one-to-one inefficient communication between blockchain nodes, and other blockchain nodes can be prevented from learning the communication content.

Figure 1:
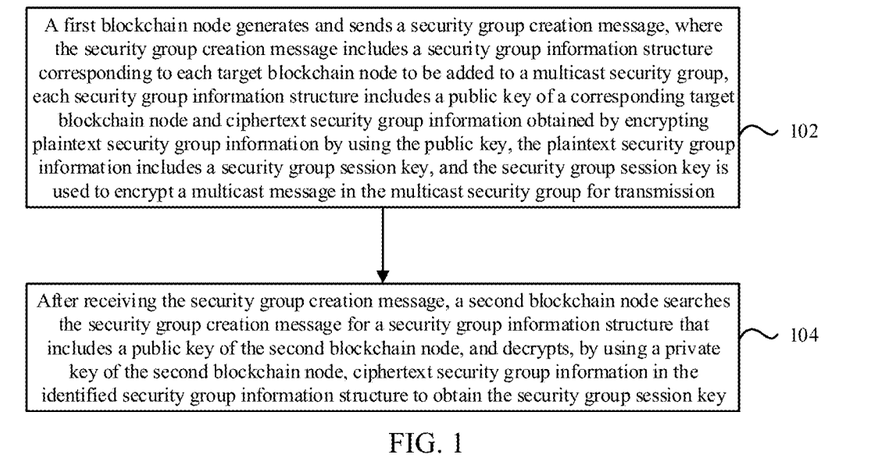
FIG. 1 is a flowchart of a method for implementing secure multicast in a blockchain network according to some example embodiments.

FIG. 1 is a flowchart of a method for implementing secure multicast in a blockchain network according to some example embodiments. As shown in FIG. 1, the method may include: Step 102: A first blockchain node generates and sends a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission.

The first blockchain node may be any blockchain node in the blockchain network. The first blockchain node creates a multicast security group by using a security group creation message, and serves as a creator of the multicast security group. Certainly, in some strictly managed blockchain networks, a specific limitation can be imposed on the creator of the multicast security group. For example, only one or more blockchain nodes designated in the blockchain network are allowed to become creators. For example, information (such as public keys) of these blockchain nodes can be recorded in the genesis block of the blockchain network, and other blockchain nodes can verify, based on this, whether a received security group creation message comes from these designated blockchain nodes. If yes, the received security group creation message is normally processed. If no, the received security group creation message is discarded.

The target blockchain node may be any one or more blockchain nodes in the blockchain network. The first blockchain node can determine the above-mentioned target blockchain node from the blockchain network through off-chain negotiation, real-world negotiation, etc., and the first blockchain node and the determined target blockchain node form the above-mentioned multicast security group, thereby implementing secure multicast between these blockchain nodes, and preventing other blockchain nodes in the blockchain network from learning content of a multicast message.

To implement secure multicast, both the first blockchain node and the target blockchain node need to maintain a same session key, and it is ensured that the session key is maintained only by the first blockchain node and the target blockchain node, and is not learned by other blockchain nodes in the blockchain network. As such, the first blockchain node and the target blockchain node can encrypt the multicast message by using the session key for transmission, and it is ensured that only the first blockchain node and the target blockchain node can decrypt the received multicast message. For example, the session key described herein may be a security group session key in this specification.

The first blockchain node can obtain the security group session key in any method. For example, the first blockchain node receives a security group session key configured by a user, or the first blockchain node generates the security group session key by using a key generation rule, or the first blockchain node obtains the security group session key from an off-chain key server. This is not limited in this specification. The first blockchain node obtains the security group session key, and further distributes the security group session key to the target blockchain node by using a security group creation message, without adding a key server in a related technology to the blockchain network, thereby helping simplify a network architecture. In addition, such a key distribution method can be applied to various blockchain nodes and conform to a decentralization characteristic of the blockchain network.

Each blockchain node can be added to a plurality of multicast security groups at the same time, provided that the blockchain node can obtain a security group session key distributed in a corresponding multicast security group.

Step 104: After receiving the security group creation message, a second blockchain node searches the security group creation message for a security group information structure that includes a public key of the second blockchain node, and decrypts, by using a private key of the second blockchain node, ciphertext security group information in the identified security group information structure to obtain the security group session key.

In the blockchain network, each blockchain node has a corresponding public-private key pair to represent its identity. A private key in the public-private key pair is maintained by each blockchain node to avoid leakage, and a public key can be made public. In view of a characteristic of a blockchain technology, each blockchain node can obtain a public key of other blockchain nodes in the blockchain network. According to the technical solution of this specification, secure distribution of the security group session key is implemented by using such a characteristic.

In a key distribution process, a function of the public key is divided into two parts: In a first part, when a security group information structure corresponding to each target blockchain node is generated, a public key of a corresponding target blockchain node is included in the security group information structure, so that after receiving a security group creation message, each blockchain node can perform matching by using a public key of the blockchain node as an identifier, so as to accurately identify a security group information structure corresponding to the blockchain node. Certainly, if the matching fails, it indicates that the blockchain node does not belong to a corresponding multicast security group. As such, accurate distribution of the security group session key is ensured. In a second part, when a security group information structure corresponding to each target blockchain node is generated, asymmetric encryption is performed by using a public key of the corresponding target blockchain node to generate the above-mentioned ciphertext security group information. It is ensured that only the target blockchain node corresponding to the security group information structure can decrypt the ciphertext security group information to obtain the security group session key. The reason is that, as described above, only the target blockchain node holds its private key, thereby ensuring secure distribution of the security group session key. Therefore, if the first blockchain node wants to add the second blockchain node as a member of the multicast security group, the first blockchain node may include, in the security group creation message, a security group information structure corresponding to the second blockchain node. The security group information structure includes a public key of the second blockchain node and ciphertext security group information generated through encryption by using the public key, so that the second blockchain node can identify the security group information structure by using the public key of the second blockchain node, and perform decryption to obtain a security group session key.

After distribution of the security group session key is completed, it is equivalent to that all the blockchain nodes in the blockchain network that obtain the security group session key form a multicast security group, and these blockchain nodes become members of the multicast security group. Secure multicast can be implemented between members of the multicast security group. Multicast messages sent between members are encrypted by using the above-mentioned security group session key for transmission, so that these multicast messages can only be decrypted by these members. Even if these multicast messages are received by other blockchain nodes in the blockchain network, the multicast messages cannot be decrypted, thereby ensuring that message content of the multicast messages certainly can only be obtained by members of the multicast security group. As such, secure multicast is implemented.

When the multicast message is encrypted by using the security group session key, members of the multicast security group can pre-configure or pre-negotiate (for example, perform off-chain negotiation or real-world negotiation on) an encryption algorithm to be used. The encryption algorithm is further used to perform a decryption operation on the multicast message. Alternatively, the plaintext security group information may include encryption algorithm indication information, and the encryption algorithm indication information is used to represent an encryption algorithm used when the above-mentioned security group session key is used to encrypt the multicast message for transmission, which is equivalent to that the first blockchain node specifies the encryption algorithm to be used. Certainly, the encryption algorithm can alternatively be determined by the first blockchain node and the target blockchain node through pre-negotiation, and is marked by the first blockchain node in the plaintext security group information.

When the security group session key is a symmetric key, the encryption algorithm to be used may be any symmetric encryption algorithm, such as AES128-GCM, AES128-CCM, AES256-GCM, AES256-CCM, AEAD_CHACHA20_POLY1305, SM4-GCM, or SM4-CCM. This is not limited in this specification. When the security group session key is an asymmetric key, the security group session key includes a public-private key pair, where a public key is used to encrypt the multicast message and a private key is used to decrypt the multicast message. Correspondingly, the encryption algorithm to be used may be any asymmetric encryption algorithm, such as RSA, Elga-mal, a Knapsack algorithm, Rabin, D-H, or ECC (an elliptic curve cryptography algorithm). This is not limited in this specification.

If one blockchain node joins only one multicast security group at the same time, the blockchain node receives and sends multicast messages only in the multicast security group, and only needs to use the security group session key distributed in the multicast security group for encryption and decryption, without confusing the multicast or security group session key. As described above, one blockchain node can join a plurality of multicast security groups at the same time. In such case, the blockchain node needs to distinguish between multicast security groups, for example, a security group session key used by each multicast security group and an encryption algorithm to be used, and for another example, a multicast security group to which a received multicast message belongs, and whether the blockchain node belongs to the multicast security group. Therefore, the plaintext security group information may further include a security group identifier, and the security group identifier corresponds to a multicast security group, for example, the security group identifier and the multicast security group are in a one-to-one correspondence. Correspondingly, a multicast message (that is, a multicast message transmitted between members of the multicast security group) in the multicast security group may include a security group identifier corresponding to the multicast security group, so as to instruct a receiver of the multicast message to perform a decryption operation by using a security group session key in plaintext security group information that includes the security group identifier. The receiver of the multicast message can determine, by using the security group identifier included in the multicast message, a multicast security group to which the multicast message belongs. If the receiver belongs to the multicast security group, the receiver maintains plaintext security group information that includes the security group identifier and that is obtained in steps 102 to 104, and further decrypts the multicast message by using a security group session key included in the plaintext security group information. Similarly, when a blockchain node wants to send a multicast message, the blockchain node can determine a multicast security group within which communication is to be performed, and can obtain, based on the determined security group identifier corresponding to the multicast security group, a security group session key from plaintext security group information that includes the security group identifier, and encrypt the multicast message by using the security group session key for transmission.

The above-mentioned security group creation message may further include a message signature generated by using a private key of the first blockchain node. Then, after receiving the security group creation message, the second blockchain node can first verify the message signature by using the public key of the first blockchain node, and when the verification succeeds, determine that the security group creation message does indeed come from the first blockchain node, that the security group creation message is not tampered with during transmission, and that the first blockchain node can perform step 104 and another operation only after it is confirmed that the verification succeeds. Otherwise, the security group creation message may be discarded or not processed.

The above-mentioned message signature can be generated by signing the key information in the security group creation message by using a private key of the first blockchain node, so that when the verification succeeds, it can be specifically proven that the key information is not tampered with. For example, the key information may include the security group information structure corresponding to each target blockchain node. For another example, in addition to the above-mentioned security group information structure, the key information may further include at least one of the following: an anti-replay random number; the public key or a digital certificate of the first blockchain node; and the like. This is not limited in this specification. Different security group creation messages sent by the first blockchain node may respectively include different anti-replay random numbers. In such case, when the currently received security group creation message and the historically received security group creation message include a same anti-replay random number, the second blockchain node can confirm that the currently received security group creation message is a replay message, and needs to be discarded or not processed. The second blockchain node normally processes the received security group creation message only when the currently received security group creation message and the historically received security group creation message include different anti-replay random numbers. The digital certificate of the first blockchain node is issued by the CA center, and the digital certificate includes a public key of the first blockchain node. When verification of the digital certificate succeeds, the second blockchain node can determine that the public key included in the digital certificate belongs to the first blockchain node.

The multicast security group may be a permanently effective security group, or may be short-term or temporary. The short-term or temporary multicast security group has specific timeliness. For example, such a multicast security group may have a validity period, so that a corresponding multicast security group can implement secure multicast only within the validity period. For example, the plaintext security group information in any one of the above-mentioned embodiments may further include a session validity period, and the session validity period is used to represent a validity period of the plaintext security group information, so that when the plaintext security group information is within the validity period, the plaintext security group information is stored by each blockchain node that has been added to the corresponding multicast security group; when the plaintext security group information is not within the validity period, the plaintext security group information is discarded or marked as invalid by each blockchain node that has been added to the corresponding multicast security group. Although the session validity period described herein is used to manage the validity period of the plaintext security group information, because security multicast in the multicast security group needs to use information such as a security group session key and a session group identifier that is included in the plaintext security group information, management of the plaintext security group information is actually management of the multicast security group, and the validity period of the plaintext security group information is the validity period of the multicast security group. A longer time of using the same plaintext security group information indicates a greater risk that the plaintext security group information is leaked. Therefore, setting the above-mentioned session validity period can avoid a potential security risk caused by long-term use of the same plaintext security group information, and force members of the corresponding multicast security group to update the plaintext security group information, thereby improving multicast security.

Figure 2:
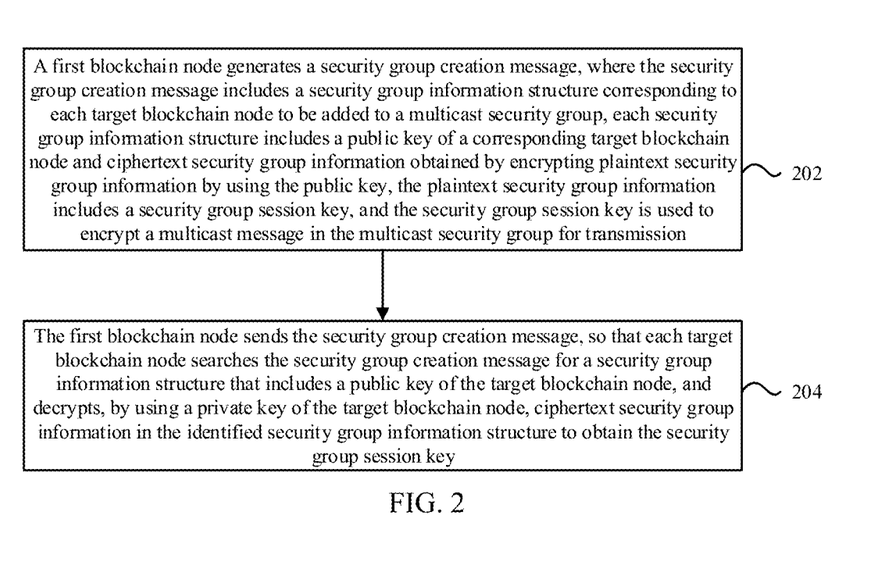
FIG. 2 is a flowchart of a method for implementing secure multicast in a blockchain network on a creator side according to some example embodiments.

FIG. 2 is a flowchart of a method for implementing secure multicast in a blockchain network on a creator side according to some example embodiments. As shown in FIG. 2, the method may include: Step 202: A first blockchain node generates a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission.

When the first blockchain node is configured to generate the security group creation message, it is equivalent to that the first blockchain node initiates creation of a corresponding multicast session group, and therefore, the first blockchain node can be considered as a creator of the multicast session group. Correspondingly, for other blockchain nodes that receive the security group creation message and obtain the security group session key and the like from the first blockchain node, it is equivalent to participating in a corresponding multicast session group. Therefore, these blockchain nodes can be considered as participants of the multicast session group. The same blockchain node can serve as a creator in some multicast security groups, and can serve as a participant in some other multicast security groups at the same time.

Step 204: The first blockchain node sends the security group creation message, so that each target blockchain node searches the security group creation message for a security group information structure that includes a public key of the target blockchain node, and decrypts, by using a private key of the target blockchain node, ciphertext security group information in the identified security group information structure to obtain the security group session key.

As described above, the plaintext security group information further includes encryption algorithm indication information, and the encryption algorithm indication information is used to represent an encryption algorithm used when the security group session key is used to encrypt the multicast message for transmission.

As described above, the plaintext security group information further includes a session validity period, and the session validity period is used to represent a validity period of the plaintext security group information. When the plaintext security group information is within the validity period, the plaintext security group information is stored by each blockchain node that has been added to the multicast security group. When the plaintext security group information is not within the validity period, the plaintext security group information is discarded or marked as invalid by each blockchain node that has been added to the multicast security group.

As described above, the plaintext security group information further includes a security group identifier, and the security group identifier corresponds to the multicast security group. The multicast message in the multicast security group includes the security group identifier, so as to instruct a receiver of the multicast message to perform a decryption operation by using a security group session key in plaintext security group information that includes the security group identifier.

As described above, the security group creation message further includes a message signature generated by using a private key of the first blockchain node.

As described above, the message signature is generated by signing key information in the security group creation message by using the private key of the first blockchain node; and the key information includes the security group information structure corresponding to each target blockchain node.

As described above, the key information further includes at least one of the following: an anti-replay random number; and the public key or a digital certificate of the first blockchain node.

Figure 3:
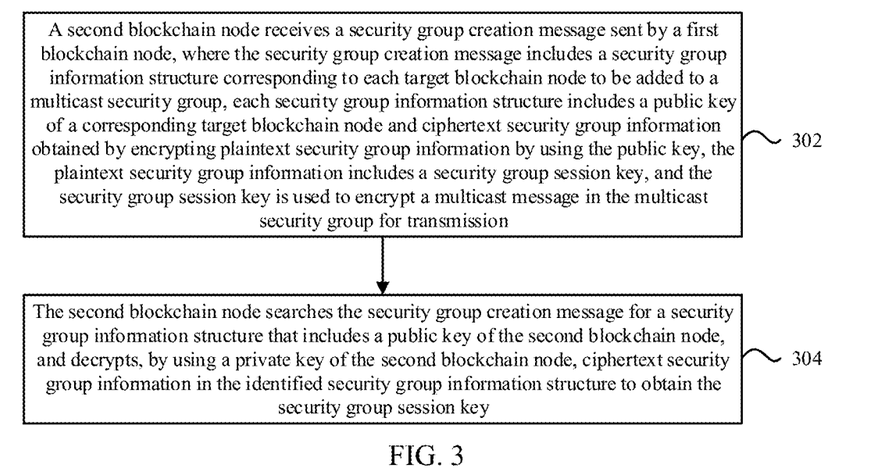
FIG. 3 is a flowchart of a method for implementing secure multicast in a blockchain network on a participant side according to some example embodiments.

FIG. 3 is a flowchart of a method for implementing secure multicast in a blockchain network on a participant side according to some example embodiments. As shown in FIG. 3, the method may include: Step 302: The second blockchain node receives a security group creation message sent by a first blockchain node, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission.

Step 304: The second blockchain node searches the security group creation message for a security group information structure that includes a public key of the second blockchain node, and decrypts, by using a private key of the second blockchain node, ciphertext security group information in the identified security group information structure to obtain the security group session key.

As described above, the plaintext security group information further includes encryption algorithm indication information, and the encryption algorithm indication information is used to represent an encryption algorithm used when the security group session key is used to encrypt the multicast message for transmission.

As described above, the plaintext security group information further includes a session validity period, and the session validity period is used to represent a validity period of the plaintext security group information. When the plaintext security group information is within the validity period, the plaintext security group information is stored by each blockchain node that has been added to the multicast security group. When the plaintext security group information is not within the validity period, the plaintext security group information is discarded or marked as invalid by each blockchain node that has been added to the multicast security group.

As described above, the plaintext security group information further includes a security group identifier, and the security group identifier corresponds to the multicast security group. The multicast message in the multicast security group includes the security group identifier, so as to instruct a receiver of the multicast message to perform a decryption operation by using a security group session key in plaintext security group information that includes the security group identifier.

As described above, the security group creation message further includes a message signature generated by using a private key of the first blockchain node. The method further includes: The second blockchain node verifies the message signature by using a public key of the first blockchain node.

As described above, the message signature is generated by signing key information in the security group creation message by using the private key of the first blockchain node; and the key information includes the security group information structure corresponding to each target blockchain node.

As described above, the key information further includes at least one of the following: an anti-replay random number; and the public key or a digital certificate of the first blockchain node.

In some embodiments shown in FIG. 1, the technical solutions for the creator side and the participant side of the multicast security group have been described with reference to processing operations separately performed by the first blockchain node and the second blockchain node. Therefore, for descriptions of related features or solutions in some embodiments shown in FIG. 2 and FIG. 3, references can be made to some embodiments shown in FIG. 1, and details are not described herein again.

Figure 4:
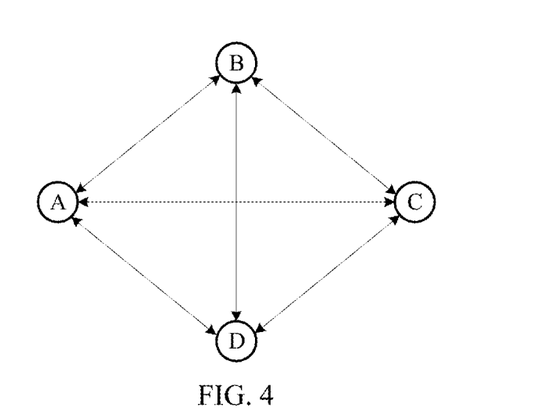
FIG. 4 is a schematic diagram of a multicast scenario according to some example embodiments.

FIG. 4 is a schematic diagram of a multicast scenario according to some example embodiments. As shown in FIG. 4, the blockchain network includes some blockchain nodes, such as a node A, a node B, a node C, and a node D. It is assumed that a multicast security group needs to be established among the node A, the node B, and the node C, so that some sensitive content can be transmitted among the node A, the node B, and the node C, and other blockchain nodes such as the node D are prevented from obtaining the sensitive content. Therefore, the node A, the node B, and the node C can perform key negotiation based on the Blockchain Security Group Generate Protocol (BSGGP) in some embodiments of this specification, so as to establish a multicast security group, and further implement secure multicast based on the Blockchain Security Group Multicast Protocol (BSGMP) in some embodiments of this specification.

Assuming that the node A serves as a creator, the node A needs to first generate a security group creation message BSGGP_GroupInfo that complies with the BSGGP, and a message structure of the BSGGP_GroupInfo may be:

```
Struct{
    Version                version    //Protocol version number
    String                 Nonce      //Random number, used to prevent a replay attack
    Cert                   cert       //Public key of the node A
    Encrypt_Session_chain  sess_chain //Structure for storing information about a multicast security group
    String                 Verify     //Signature of Nonce, cert, and sess_chain
}BSGGP_GroupInfo
```

In the message structure of the BSGGP_GroupInfo, Encrypt_Session_chain is used to store information about the multicast security group, and the information about the multicast security group may be a security group information structure corresponding to each target blockchain node to be added to the multicast security group in some embodiments described above. A structure of Encrypt_Session_chain may be:

```
Struct{
    BSG_Encrypt_Session  sess[Group_member_num-1];
}Encrypt_Session_chain
```

BSG_Encrypt_Session is the above-mentioned security group information structure, and security group information structures corresponding to various target blockchain nodes such as the node B and the node C can form a chain, and then are added to the above-mentioned Encrypt_Session_chain in a chain structure. When these security group information structures form a chain structure, they can be successively concatenated in a predetermined order (for example, in an order of sizes of IP addresses or in an order of sizes of public keys of nodes, which is not limited in this specification). The concatenation may alternatively be unordered. The concatenation order does not affect a negotiation effect.

A structure of BSG_Encrypt_Session may be:

```
Struct{
    PublicKey     key;   //Public key of the target blockchain node
    Enc_Session   sess;  //Ciphertext security group information generated after
the BSG_Session is encrypted by using the public key of the target blockchain node
}BSG_Encrypt_Session
```

It can be learned from the above-mentioned structure of BSG_Encrypt_Session that, a corresponding BSG_Encrypt_Session needs to be separately generated for each target blockchain node, and each BSG_Encrypt_Session includes a public key of a corresponding target blockchain node, so that regardless of an order in which the BSG_Encrypt_Session is concatenated, each target blockchain node can always identify BSG_Encrypt_Session corresponding to the target blockchain node by matching a public key of the target blockchain node, and therefore, a concatenation order of the BSG_Encrypt_Session does not affect a negotiation effect.

Enc_Session is equivalent to the ciphertext security group information described above, and Enc_Session is obtained by encrypting BSG_Session by using a public key of a target blockchain node corresponding to BSG_Encrypt_Session to which Enc_Session belongs, where BSG_Session is equivalent to the plaintext security group information described above. For example, in the BSG_Encrypt_Session corresponding to the node B, the included Enc_Session is obtained by encrypting the BSG_Session by using a public key of the node B, and in the BSG_Encrypt_Session corresponding to the node C, the included Enc_Session is obtained by encrypting the BSG_Session by using a public key of the node C. It can be learned that only the target blockchain node corresponding to the BSG_Encrypt_Session can decrypt the Enc_Session by using the private key maintained by the target blockchain node, so as to obtain the BSG_Session. However, even if other blockchain nodes can obtain the BSG_Encrypt_Session, they cannot complete the decryption because they cannot obtain the private key, thereby implementing secure transmission of the BSG_Session and ensuring security of a negotiation process.

In BSG_Encrypt_Session corresponding to each node, BSG_Session corresponding to Enc_Session is the same. The BSG_Session may include any content that the node A wants to transmit to the node B and the node C. Certainly, the content is usually related to a multicast session group that needs to be created. For example, a structure of the BSG_Session may be:

```
Struct{
    uint32  session_lifetime_hint;  //Session validity period
    String  BSG_ID;     //Security group identifier
    uint32  cipher_id;  //Encryption algorithm to be used
    String  Master_key; //Security group session key
}BSG_Session
```

After performing decryption to obtain the BSG_Session, each target blockchain node stores the BSG_Session. The session_lifetime_hint included in each BSG_Session is used to indicate a validity period of a corresponding multicast session group or a validity period of a corresponding session. In such case, the target blockchain node can delete a BSG_Session or mark the BSG_Session as invalid when determining that the session_lifetime_hint included in the BSG_Session expires. Alternatively, when checking that the session_lifetime_hint included in the corresponding BSG_Session expires before needing to send a multicast message, the target blockchain node does not use the Master_key in the BSG_Session for encryption. In other words, the Master_key in the BSG_Session is used to encrypt the multicast message for transmission only when the session_lifetime_hint included in the BSG_Session does not expire.

The BSG_ID is used to mark a multicast session group or a session corresponding to the multicast session group, so that multicast messages transmitted between members of the multicast session group each include the BSG_ID. As such, after receiving the multicast message, a blockchain node can match a BSG_Session maintained by the blockchain node based on the BSG_ID included in the multicast message, and decrypt the received multicast message by using a Master_key in the BSG_Session that includes the BSG_ID. The Master_key is used to perform encryption and decryption processing on the multicast message. The cipher_id is used to indicate an algorithm used by members of the multicast session group to perform encryption and decryption processing.

After the node A, the node B, and the node C complete the negotiation in the above-mentioned method, the node A, the node B, and the node C each locally maintain the BSG_Session, so that the node A, the node B, and the node C form one multicast security group, and these nodes can implement secure multicast based on the jointly maintained BSG_Session.

Assuming that the node B wants to send a multicast message to the node A and the node C, the node B first generates a message structure BSG_Plaintext that complies with the BSGMP. A structure of the BSG_Plaintext may be:

```
Struct{
    String     content; //Plaintext message content
    uint8      zeros[length_of_padding-1]; //When the last block of the plaintext
message content has less than 128 bits, the last block is padded with all 0s
    uint8      length_of_padding; //Used to describe a length of padding
    }BSG_Plaintext
```

In the above-mentioned message structure BSG_Plaintext, message content that needs to be transmitted by the node B is recorded in the content in a plaintext form. In some cases, the BSG_Plaintext may include only the content. In some embodiments described above, the BSG_Plaintext is organized by using a block structure, for example, a length of each block is 128 bits. In such case, when a length of content is exactly an integer multiple of 128 bits, the content can exactly pad some corresponding blocks, and the BSG_Plaintext may not include zeros[length_of_padding-1] and length_of_padding, either. However, when a length of content is not exactly an integer multiple of 128 bits, 128 bits of the last block cannot be padded. All the unpadded portions can be padded with 0 s. The above-mentioned zeros[length_of_padding-1] corresponds to the portions (i.e., padding) padded with 0 s, and length_of_padding is used to describe a length of padding.

Further, the node B can construct the above-mentioned BSG_Plaintext, so as to generate a multicast message BSG_Message. A message structure of the BSG_Message may be:

```
Struct{
    Int          BSG_Message. Length;    //Message length
    String   BSG_ID;   //Security group identifier
    64bit        seq_num;   //iv of symmetric encryption, auto increment for each
application layer message
    String.      BSG_Ciphertext;   //BSG_Plaintext message encrypted by using
the BSG_key
    }BSG_Message
```

When generating the BSG_Message, the node B needs to use the BSG_Session obtained in the above-mentioned process. Actually, when the node B wants to send the BSG_Message in a multicast session group, the node B should use the BSG_Session corresponding to the multicast session group, and generate the above-mentioned BSG_Message by using the BSG_ID and the Master_key included in the BSG_Session.

The BSG_Ciphertext is generated by the node B by encrypting the BSG_Plaintext by using the Master_key. When an encryption algorithm such as AES128-GCM is used, the encryption algorithm further requires that a random number iv be used to increase security of symmetric encryption, so that a structure of the BSG_Message includes the above-mentioned seq_num. Certainly, the node B can separately send the seq_num to the node A and the node C, instead of integrating the seq_num into the structure of the BSG_Message for sending. As such, even if both the Master_key and the BSG_Message are exposed, the BSG_Ciphertext may not be decrypted correctly because the seq_num is not exposed, thereby helping improve security. In some embodiments described above, integrating the seq_num into a structure of the BSG_Message for sending can avoid increasing a quantity of interaction times caused by sending the seq_num separately, thereby helping improve communication efficiency.

Using AES128-GCM as an example, the BSG_Ciphertext can be generated by encrypting the BSG_Plaintext in the following method: BSG_Ciphertext=AES128-GCM-Encrypt(Master_key, seq_num, additional_data, BSG_Plaintext)

Here,
additional_data=BSG_Message.length||BSG_Message

In such case, for example, if the node C receives the above-mentioned BSG_Message sent by the node B, the node C can perform matching on all the BSG_Session maintained by the node C based on the BSG_ID included in the BSG_Message, to determine the BSG_Session that includes the BSG_ID. Further, the node C can read the cipher_id and the Master_key from the determined BSG_Session, and decrypt the BSG_Ciphertext in the received BSG_Message based on the cipher_id and the Master_key, so as to obtain the BSG_Plaintext in the plaintext. Still using AES128-GCM as an example, the BSG_Plaintext can be obtained by decrypting the BSG_Ciphertext in the following method: BSG_Plaintext=AES128-GCM-Decrypt(Master_key, seq_num, additional_data, BSG_Ciphertext)

With respect to transmission of a multicast message, a blockchain node serving as a sender can designate information about a blockchain node serving as a receiver in a corresponding message packet. For example, an IP address of the blockchain node is added to a packet header, so that the multicast message can be directionally sent to the blockchain node designated as a receiver and is not sent to other blockchain nodes, thereby reducing network resources. Certainly, there are still many methods for implementing directional sending. For example, when blockchain nodes communicate with each other by using a blockchain relay communication network, identification information corresponding to these blockchain nodes can be added to a message packet, so that the blockchain relay communication network can directionally send a multicast message to these blockchain nodes designated as receivers instead of sending the multicast message to other blockchain nodes.

Certainly, a blockchain node that does not belong to the multicast session group may also receive the multicast message. For example, if the node D receives the above-mentioned BSG_Message sent by the node B, the node D can also perform matching on all the BSG_Session maintained by the node D based on the BSG_ID included in the BSG_Message, but the node D cannot obtain, through matching, the BSG_Session that includes the BSG_ID, and therefore cannot decrypt the BSG_Ciphertext in the received BSG_Message. In terms of security, it is equivalent to that the node D does not receive the multicast message.

In conclusion, in this specification, each blockchain node in the blockchain network can obtain a public key of another blockchain node. With such a characteristic, the security group creation message generated by the first blockchain node may include the security group information structure corresponding to each target blockchain node. In addition, each security group information structure includes only a public key of a corresponding target blockchain node and ciphertext security group information encrypted based on the public key, so that the target blockchain node can identify a security group information structure corresponding to the target blockchain node by matching a public key. In addition, it can be ensured that the ciphertext security group information can only be decrypted by the target blockchain node by using a private key of the target blockchain node, and cannot be decrypted by another blockchain node. As such, a secure and accurate key sharing operation can be implemented to create a multicast security group without requiring an additional centralized key server, so that blockchain nodes in the multicast security group can implement secure multicast by using the above-mentioned security group session key.

Figure 5:
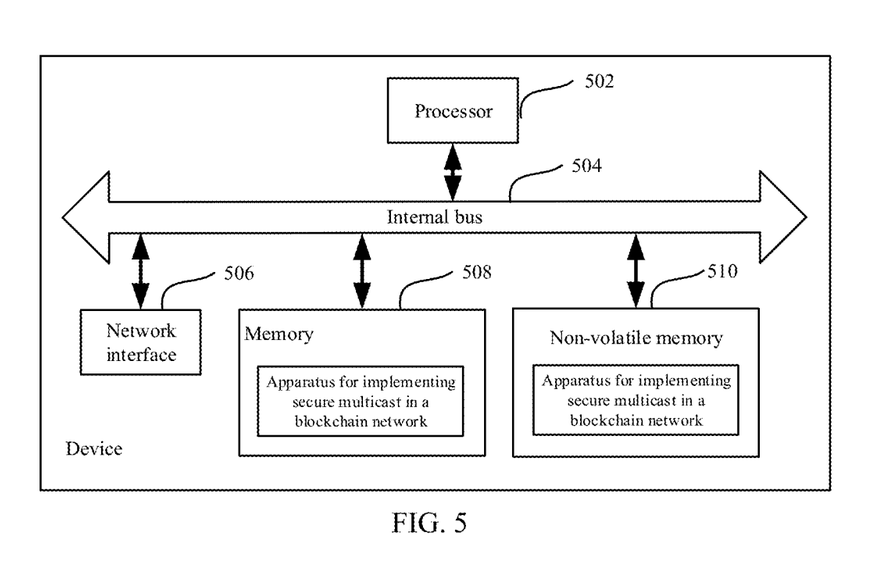
FIG. 5 is a schematic structural diagram of a device according to some example embodiments.

FIG. 5 is a schematic structural diagram of a device according to some example embodiments. References are made to FIG. 5. At the hardware level, the device includes a processor 502, an internal bus 504, a network interface 506, a memory 508, and a non-volatile memory 510, and certainly may further include other hardware needed by a service. The processor 502 reads a corresponding computer program from the non-volatile memory 510 to the memory 508, and then runs the computer program to form an apparatus for implementing secure multicast in a blockchain network at the logic level. Certainly, in addition to software implementations, one or more embodiments of this specification do not preclude other implementations, such as a logic device or a combination of software and hardware. In other words, an execution body of the following processing procedure is not limited to each logical unit, and can be hardware or a logic device.

Figure 6:
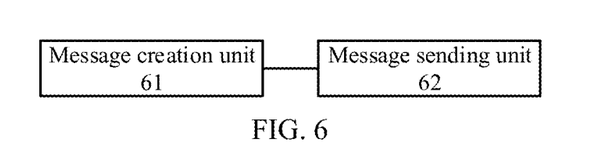
FIG. 6 is a block diagram of an apparatus for implementing secure multicast in a blockchain network on a creator side according to some example embodiments.

Referring to FIG. 6, in some software implementations, the apparatus for implementing secure multicast in a blockchain network on a creator side may include:

a message creation unit 61, configured to enable a first blockchain node to generate a security group creation message, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and a message sending unit 62, configured to enable the first blockchain node to send the security group creation message, so that each target blockchain node searches the security group creation message for a security group information structure that includes a public key of the target blockchain node, and decrypts, by using a private key of the target blockchain node, ciphertext security group information in the identified security group information structure to obtain the security group session key.

Optionally, the plaintext security group information further includes encryption algorithm indication information, and the encryption algorithm indication information is used to represent an encryption algorithm used when the security group session key is used to encrypt the multicast message for transmission.

Optionally, the plaintext security group information further includes a session validity period, and the session validity period is used to represent a validity period of the plaintext security group information. When the plaintext security group information is within the validity period, the plaintext security group information is stored by each blockchain node that has been added to the multicast security group. When the plaintext security group information is not within the validity period, the plaintext security group information is discarded or marked as invalid by each blockchain node that has been added to the multicast security group.

Optionally, the plaintext security group information further includes a security group identifier, and the security group identifier corresponds to the multicast security group. The multicast message in the multicast security group includes the security group identifier, so as to instruct a receiver of the multicast message to perform a decryption operation by using a security group session key in plaintext security group information that includes the security group identifier.

Optionally, the security group creation message further includes a message signature generated by using a private key of the first blockchain node.

Optionally, the message signature is generated by signing key information in the security group creation message by using the private key of the first blockchain node; and the key information includes the security group information structure corresponding to each target blockchain node.

Optionally, the key information further includes at least one of the following: an anti-replay random number; and the public key or a digital certificate of the first blockchain node.

Figure 7:
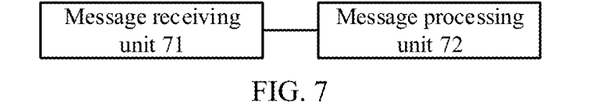
FIG. 7 is a block diagram of an apparatus for implementing secure multicast in a blockchain network on a participant side according to some example embodiments.

Referring to FIG. 7, in some software implementations, the apparatus for implementing secure multicast in a blockchain network on a participant side may include: a message receiving unit 71, configured to enable a second blockchain node to receive a security group creation message sent by a first blockchain node, where the security group creation message includes a security group information structure corresponding to each target blockchain node to be added to a multicast security group, each security group information structure includes a public key of a corresponding target blockchain node and ciphertext security group information obtained by encrypting plaintext security group information by using the public key, the plaintext security group information includes a security group session key, and the security group session key is used to encrypt a multicast message in the multicast security group for transmission; and a message processing unit 72, configured to enable the second blockchain node to search the security group creation message for a security group information structure that includes a public key of the second blockchain node, and decrypt, by using a private key of the second blockchain node, ciphertext security group information in the identified security group information structure to obtain the security group session key.

Optionally, the plaintext security group information further includes encryption algorithm indication information, and the encryption algorithm indication information is used to represent an encryption algorithm used when the security group session key is used to encrypt the multicast message for transmission.

Optionally, the plaintext security group information further includes a session validity period, and the session validity period is used to represent a validity period of the plaintext security group information. When the plaintext security group information is within the validity period, the plaintext security group information is stored by each blockchain node that has been added to the multicast security group. When the plaintext security group information is not within the validity period, the plaintext security group information is discarded or marked as invalid by each blockchain node that has been added to the multicast security group.

Optionally, the plaintext security group information further includes a security group identifier, and the security group identifier corresponds to the multicast security group. The multicast message in the multicast security group includes the security group identifier, so as to instruct a receiver of the multicast message to perform a decryption operation by using a security group session key in plaintext security group information that includes the security group identifier.

Optionally, the security group creation message further includes a message signature generated by using a private key of the first blockchain node. The method further includes: The second blockchain node verifies the message signature by using a public key of the first blockchain node.

Optionally, the message signature is generated by signing key information in the security group creation message by using the private key of the first blockchain node; and the key information includes the security group information structure corresponding to each target blockchain node.

Optionally, the key information further includes at least one of the following: an anti-replay random number; and the public key or a digital certificate of the first blockchain node.

The system, apparatus, module, or unit illustrated in the above-mentioned embodiments can be specifically implemented by using a computer chip or an entity, or can be implemented by using a product having a specific function. A typical implementation device is a computer, and a specific form of the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), one or more input/output interfaces, one or more network interfaces, and one or more memories. The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes a persistent and a non-persistent, a removable and a non-removable medium, which implement information storage by using any method or technology. Information may be a computer-readable instruction, a data structure, a module of a program or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on graphene, another magnetic storage device, or any other non-transmission medium. The computer storage medium can be used to store information that can be accessed by the computing device. Based on the definition in this specification, the computer-readable medium does not include transitory media such as a modulated data signal and carrier.

It should be further noted that, the terms "include", "comprise", or any other variant thereof are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or may be advantageous.

Terms used in one or more embodiments of this specification are merely used to describe specific embodiments, and are not intended to limit the one or more embodiments of this specification. The terms "a" and "the" of singular forms used in one or more embodiments of this specification and the appended claims are also intended to include plural forms, unless otherwise specified in the context clearly. It should be further understood that the term "and/or" used in this specification indicates and includes any or all possible combinations of one or more associated listed items.

It should be understood that although terms "first", "second", "third", etc. may be used in one or more embodiments of this specification to describe various types of information, the information is not limited to these terms. These terms are merely used to differentiate between information of the same type. For example, without departing from the scope of one or more embodiments of this specification, first information can also be referred to as second information, and similarly, the second information can also be referred to as the first information. Depending on the context, for example, the word "if" used here can be explained as "while", "when", or "in response to determining".

The previous descriptions are merely example embodiments of one or more embodiments of this specification, but are not intended to limit the one or more embodiments of this specification. Any modification, equivalent replacement, improvement, etc. made without departing from the spirit and principle of the one or more embodiments of this specification shall fall within the protection scope of the one or more embodiments of this specification.

What is claimed is:

1. A method for implementing secure multicast in a blockchain network, comprising:
　　generating, by a first blockchain node, a security group creation message, wherein the security group creation message comprises a security group information structure corresponding to each target blockchain node to be added to a multicast security group, each security group information structure comprises a public key of a corresponding target blockchain node and ciphertext security group information obtained by encrypting plaintext security group information by using the public key, the plaintext security group information comprises a security group session key, and the security group session key is used to encrypt a multicast message in the multicast security group for transmission; and sending, by the first blockchain node, the security group creation message, so that each target blockchain node searches the security group creation message for a security group information structure that comprises a public key of the target blockchain node, and decrypts, by using a private key of the target blockchain node, ciphertext security group information in the identified security group information structure to obtain the security group session key.

2. The method according to claim 1, wherein the plaintext security group information further comprises encryption algorithm indication information, and the encryption algorithm indication information is used to represent an encryption algorithm used when the security group session key is used to encrypt the multicast message for transmission.

3. The method according to claim 1, wherein the plaintext security group information further comprises a session validity period, and the session validity period is used to represent a validity period of the plaintext security group information; and when the plaintext security group information is within a validity period, the plaintext security group information is stored by each blockchain node that has been added to the multicast security group; when the plaintext security group information is not within a validity period, the plaintext security group information is discarded or marked as invalid by each blockchain node that has been added to the multicast security group.

4. The method according to claim 1, wherein the plaintext security group information further comprises a security group identifier, and the security group identifier corresponds to the multicast security group; and the multicast message in the multicast security group comprises the security group identifier, so as to instruct a receiver of the multicast message to perform a decryption operation by using a security group session key in plaintext security group information that comprises the security group identifier.

5. The method according to claim 1, wherein the security group creation message further comprises a message signature generated by using a private key of the first blockchain node.

6. The method according to claim 5, wherein the message signature is generated by signing key information in the security group creation message by using the private key of the first blockchain node; and the key information comprises the security group information structure corresponding to each target blockchain node.

7. The method according to claim 6, wherein the key information further comprises at least one of the following:
an anti-replay random number; and
a public key or a digital certificate of the first blockchain node.

8. A method for implementing secure multicast in a blockchain network, comprising:

receiving, by a second blockchain node, a security group creation message sent by a first blockchain node, wherein the security group creation message comprises a security group information structure corresponding to each target blockchain node to be added to a multicast security group, each security group information structure comprises a public key of a corresponding target blockchain node and ciphertext security group information obtained by encrypting plaintext security group information by using the public key, the plaintext security group information comprises a security group session key, and the security group session key is used to encrypt a multicast message in the multicast security group for transmission; and searching, by the second blockchain node, the security group creation message for a security group information structure that comprises a public key of the second blockchain node, and decrypting, by using a private key of the second blockchain node, ciphertext security group information in the identified security group information structure to obtain the security group session key.

9. The method according to claim 8, wherein the plaintext security group information further comprises encryption algorithm indication information, and the encryption algorithm indication information is used to represent an encryption algorithm used when the security group session key is used to encrypt the multicast message for transmission.

10. The method according to claim 8, wherein the plaintext security group information further comprises a session validity period, and the session validity period is used to represent a validity period of the plaintext security group information; and when the plaintext security group information is within a validity period, the plaintext security group information is stored by each blockchain node that has been added to the multicast security group; when the plaintext security group information is not within a validity period, the plaintext security group information is discarded or marked as invalid by each blockchain node that has been added to the multicast security group.

11. The method according to claim 8, wherein the plaintext security group information further comprises a security group identifier, and the security group identifier corresponds to the multicast security group; and the multicast message in the multicast security group comprises the security group identifier, so as to instruct a receiver of the multicast message to perform a decryption operation by using a security group session key in plaintext security group information that comprises the security group identifier.

12. The method according to claim 8, wherein the security group creation message further comprises a message signature generated by using a private key of the first blockchain node; and the method further comprises:

verifying, by the second blockchain node, the message signature by using a public key of the first blockchain node.

13. The method according to claim 12, wherein the message signature is generated by signing key information in the security group creation message by using the private key of the first blockchain node; and the key information comprises the security group information structure corresponding to each target blockchain node.

14. The method according to claim 13, wherein the key information further comprises at least one of the following:
an anti-replay random number; and
the public key or a digital certificate of the first blockchain node.

15. A computing device comprising a memory and a processor, wherein the memory stores executable instructions that, in response to execution by the processor, cause the computing device to:
- generate, by a first blockchain node, a security group creation message, wherein the security group creation message comprises a security group information structure corresponding to each target blockchain node to be added to a multicast security group, each security group information structure comprises a public key of a corresponding target blockchain node and ciphertext security group information obtained by encrypting plaintext security group information by using the public key, the plaintext security group information comprises a security group session key, and the security group session key is used to encrypt a multicast message in the multicast security group for transmission; and
- send, by the first blockchain node, the security group creation message, so that each target blockchain node searches the security group creation message for a security group information structure that comprises a public key of the target blockchain node, and decrypts, by using a private key of the target blockchain node, ciphertext security group information in the identified security group information structure to obtain the security group session key.

16. A computing device comprising a memory and a processor, wherein the memory stores executable instructions that, in response to execution by the processor, cause the computing device to:
- receive, by a second blockchain node, a security group creation message sent by a first blockchain node, wherein the security group creation message comprises a security group information structure corresponding to each target blockchain node to be added to a multicast security group, each security group information structure comprises a public key of a corresponding target blockchain node and ciphertext security group information obtained by encrypting plaintext security group information by using the public key, the plaintext security group information comprises a security group session key, and the security group session key is used to encrypt a multicast message in the multicast security group for transmission; and
- search, by the second blockchain node, the security group creation message for a security group information structure that comprises a public key of the second blockchain node, and decrypting, by using a private key of the second blockchain node, ciphertext security group information in the identified security group information structure to obtain the security group session key.

* * * * *